Dec. 1, 1942.    C. E. ARNDT    2,303,716
CARBONATOR
Filed Jan. 19, 1940    2 Sheets-Sheet 1
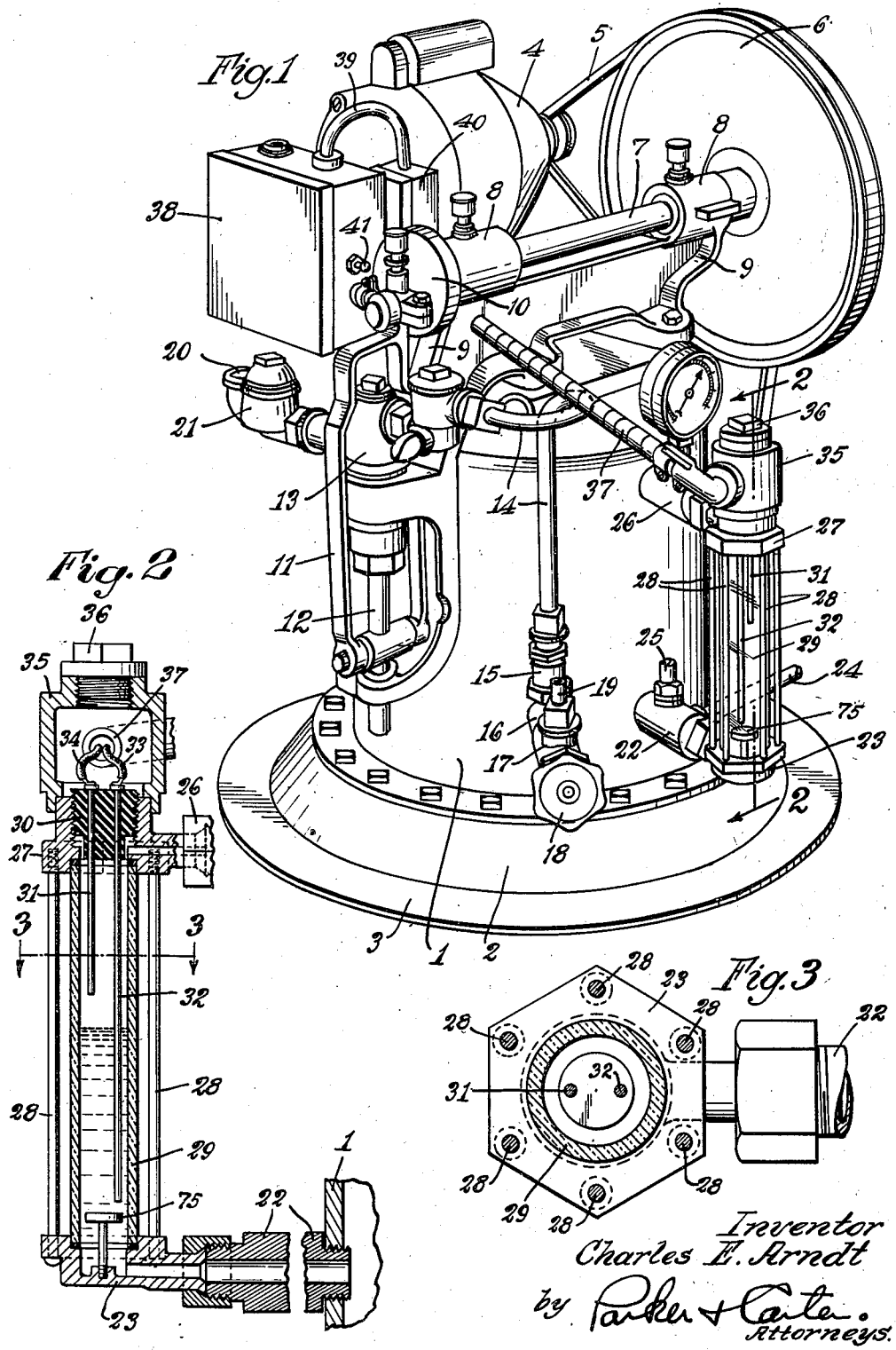
Inventor
Charles E. Arndt
by Parker & Carter
Attorneys.

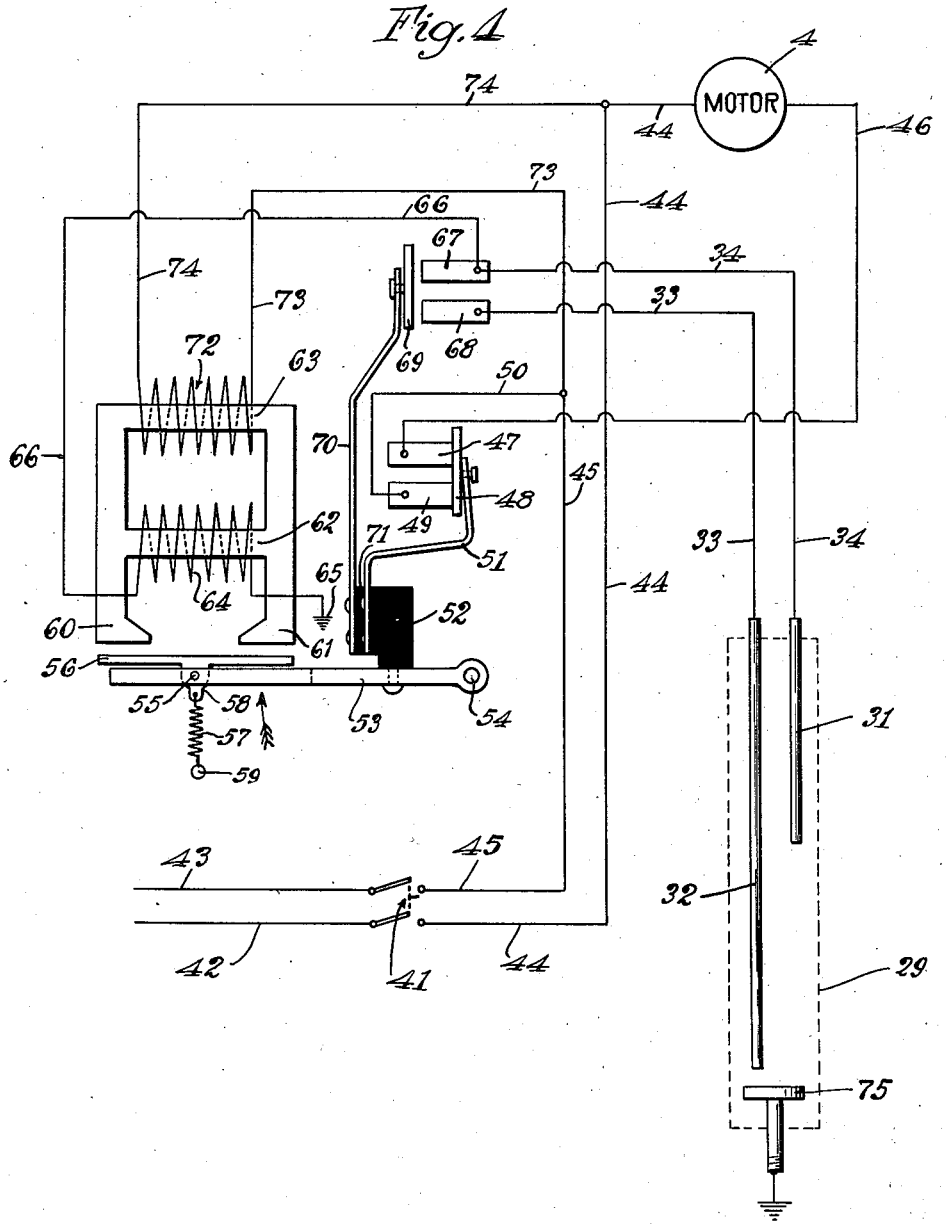

Patented Dec. 1, 1942

2,303,716

UNITED STATES PATENT OFFICE 2,303,716

CARBONATOR

Charles E. Arndt, Wonder Lake, Ill., assignor to The Bastian-Blessing Company, Chicago, Ill., a corporation of Illinois Application January 19, 1940, Serial No. 314,675

8 Claims. (Cl. 103—25)

This invention relates to a fluid level control. In the particular form here shown, it is applied to a carbonator which comprises a container for liquid to be carbonated and means for carbonating the liquid in the container, together with a control responsive to variations in the level of liquid within the container. One object of the invention is to provide a visual gauge in combination with a liquid level responsive contact assembly. Another object is to provide a nonmetallic combined liquid level contact assembly and gauge glass construction.

Other objects will appear from time to time in the specification and claims.

The invention is illustrated more or less diagrammatically in the accompanying drawings, wherein:

Figure 1 is a side elevation in perspective of one form of a carbonator to which the structure of the present invention is applied.

Figure 2 is a transverse vertical cross section taken on an enlarged scale at line 2—2 of Figure 1.

Figure 3 is a transverse horizontal section taken on a further enlarged scale at line 3—3 of Figure 2.

Figure 4 is a schematic wiring diagram illustrating an electric circuit suitable for use in connection with the contacts of the present invention.

Like parts are designated by like characters throughout the specification and the drawings.

As shown in Figure 1, the carbonator comprises a tanklike member 1 which may be of single or double wall construction. The particular details of the carbonator form no essential part of the present invention, which is not limited in its use to the application to a carbonator. The details of the carbonator are illustrated only in so far as is necessary to indicate the use of the present invention. The carbonator may be secured to a base 2 which has a flange 3 for contact with a suitable floor or foundation to which it may be secured, if desired. A motor 4 may be mounted on the carbonator and by means of a V-belt 5 drives a grooved pulley 6 which is secured on a shaft 7 carried in suitable bearings 8, 8, from supports 9. An eccentric 10 mounted on the shaft 7 operates by means of a cross head 11 the piston 12 of a pump enclosed within a housing 13. Water leaves the pump through the pipe 14 which, at its lower end, enters the tank 1 and may have a carbonator line inlet check valve within a housing 15. Carbonated water leaves through a connection 16 which is controlled by a valve within a housing 17, which valve is controlled by a handwheel 18. 19 is the outlet pipe for carbonated water. It is broken away, as shown in Figure 1, and may be connected to any desired source for utilizing the carbonated liquid. Liquid enters the pump through the connection 20 from any suitable source. Within a housing 21 there may be mounted a strainer and air chamber for the pump inlet, if desired.

22 is a connector communicating with the interior of the tank as shown in Figures 1 and 2. It communicates, also, with the base member 23 of the combined gauge and contact housing. A gas inlet pipe 24 may, also, be connected to the member 22, and through it gas enters the tank from any suitable source. A pipe or connection 25 may be provided to a safety valve, not shown, if such a valve is desired in the assembly.

A second connection 26 communicates with the interior of the tank, as shown in Figures 1 and 2, and communicates with an upper gauge housing member 27. Joining the two gauge housing members 23 and 27 are bars or protection members 28 which surround and protect a gauge glass 29. This gauge glass may, of course, be of glass or any other sufficiently strong and transparent material. Removably positioned within the housing member 27 is a contact supporting member 30 which is formed of insulating material or may be of any material provided it is insulated from the housing member 27 and provided that it furnishes insulating supports for the contact members 31 and 32, which are, respectively, the short and the long contacts. These contacts are connected to wires or conductors 33 and 34, which pass, first, through a hollow housing member 35, which may have a removable closure plug 36. Thence, the wires or conductors 33 and 34 pass through an armored conduit or tube 37 to a control housing 38 within which are provided an automatic electric switch and associated control parts by means of which the motor is caused to stop and start, when desired, in response to variations in the fluid level, as will be described below. Conductors pass from the housing 38 and controls located in it through a tube or conduit 39 to a connection housing 40 in which connections are made to the motor. A manual emergency cutout switch member 41 may, if desired, be provided on the outside of the housing 38.

I shall now describe the schematic wiring diagram of Figure 4. Electric current is supplied through wires or conductors 42 and 43, which are connected to the switch 41, and from which corresponding wires 44 and 45 lead. The wire 44 is connected to the motor from which a wire 46 leads to one of the contacts 47 of a relay switch 48. 49 is a second contact on the switch 48 to which the wire 45 is connected by a wire 50. The relay switch 48 is connected by a spring 51 to insulation 52 which is mounted on an armature 53 which is pivoted as at 54 on any suitable base; actually, it is, of course, within the housing 38. Pivoted as at 55 on the armature 53 is a contact member 56. A spring 57 is secured at one end to a portion 58 which forms a part of the contact member 56 and is secured on a base 59. The spring tends, when free to do so, to hold the armature 53 down and to prevent the contact member 56 from making any contact and to center the contact member 56. Positioned to be contacted by the contact member 56 are the two branches 60 and 61 of a combined relay and transformer. These branches are connected by a core 62 and by a second core 63. About the core 62 is positioned a coil 64 which, at one end, is grounded on the frame as at 65. At its other end, the coil 64 is connected by a wire or conductor 66 to one contact 67 of a switch. This contact 67 is also connected to the wire 34 from the contact member 31. A second contact 68 is connected by a wire 33 to the contact member 32. 69 is a contact member positioned to make contact with the contacts 67 and 68 simultaneously. The contact member 69 is mounted on an arm 70 which is mounted on insulation 71 which itself is carried on the insulation 52 and, thus, is supported by and arranged to move with the armature 53.

About the core 63 is mounted the primary coil 72 of the transformer. One end of this coil is connected by a wire 73 with the wire 45, and the other end is connected by a wire 74 with the wire 44. Thus, the transformer coil is energized so long as the switch 41 is in the closed position and irrespective of the position of any of the other contacts.

The operation of the circuit indicated in Figure 4 is as follows:

It is assumed that the apparatus is in use and that the master switch 41 is closed. Thus, current is supplied to the transformer. Some liquid is in the system. In the position shown, the motor will be running and the water level within the gauge glass 29 may be either below and out of contact with the contact 32 or it may be above its lower edge and short of the lower end of this contact 31. It is assumed that the water is rising in this position and the motor will be running because switch member 48 is in the position shown in contact with the contacts 47 and 49.

If the water now rises until it contacts the contact 31, the circuit will be completed through that contact and the wire 34 to the contact member 67. The connection is then through the water and through the ground 65 to the relay coil 64, thus, energizing the relay, raising the armature 53 and bringing the contact member 56 into contact with the branches 60 and 61. When that happens, the switch 48 is moved out of contact with the contacts 47 and 49 and breaks the motor circuit and stops the motor, thus putting the pump out of operation and stopping the input of liquid into the tank 1. At the same time that the contact is broken at switch 48, the arm 70 moves to the right from the position of Figure 4 and brings the contact 69 into contact with the members 67 and 68. The circuit is now through the member 31, the wire 34, the wire 66, the coil 64 and ground 65 and through the water which is also grounded, and, thus, makes a connection with the contact 31. The water level will normally now begin to decline because the liquid will be drawn off for use. When it has declined so that the level in the gauge glass 29 is below the bottom end of the contact 31, the motor will still not be started because the liquid remains in contact with the contact 32 and the circuit is, thus, through the member 32, the wire 33, contact 68, across the member 69 to the contact 67, through the wire 66, to the coil 64 and the ground 65, and through the water in the gauge glass. If the level of liquid now finally declines below the bottom of the contact 32, the circuit is broken, the coil 64 is de-energized, the armature 53 falls, the member 56 is moved out of contact with the members 60 and 61, the member 69 is moved out of contact with the members 67 and 68, the member 48 is brought into contact with the members 47 and 49; the motor circuit is, thus, recompleted, the motor starts again, starting the pump and commencing again to introduce fluid into the tank 1. This operation will continue in response to fluctuation in the fluid level within the tank just as long as the master switch 41 is in the closed position. The purpose of the two contacts 31 and 32 and the reason for having them of different lengths is to prevent constant off-and-on movements of the motor and to give a longer period after the motor has once been shut off before it starts again, and, also, to give a longer period after the motor has started before it is cut off.

An additional conductor 75 may, if desired, be inserted within the gauge glass and preferably, if it is used, it will be fairly close to the longer contact 32. The purpose of such an additional contact is to shorten the water gap through which current passes.

Although there is shown an operative form of the device, it will be understood that many changes in the form, shape and arrangement of parts might be made without departing from the spirit of this invention, and it is wished that the showing be taken as, in a sense, diagrammatic.

The particular details of the electric mechanism forming the automatic motor control form no essential part of the present invention and have been described only sufficiently to explain the operation of the device. Other electrical mechanisms could be used and that illustrated and described is available on the market commercially. The particular contacting mechanism and the combination of the two contacts of different length in the liquid and the combination of the contacts with a non-metallic transparent gauge glass are important features of the present invention which could, of course, be utilized in many other connections where a gauge glass and level responsive electrical contacts are desirable.

The use and operation of this invention are as follows:

The operation of the electric circuit has been described above. In general, the machine is used to carbonate liquid. Water, or whatever liquid is to be carbonated, is brought into the tank, gas is introduced, carbonation is effected and the carbonated fluid is withdrawn. Almost inevitably there will be fluctuations in the level of liquid within the tank and if no automatic control were provided, the machine might run dry, might get too full, and, for that reason, the automatic control above described is advantageous. Ordinarily, when the machine is to be used, it will be put into operation at the beginning of a day by moving the master switch 41 to the closed position, and this switch will remain closed so long as the machine is to be used and the automatic control will act to start and stop the motor and, thus, to start and stop the introduction of fluid into the tank.

Should either of the members 31 and 32 become bent so that they contact the gauge glass 29, no harm will result because that member is made of glass or other relatively transparent and non-conductive material. Should the gauge glass or the container within which the contacts 31 and 32 are mounted be made of metal, then should one of the contacts be bent or displaced so as to come in contact with the metal shell, a short circuit would result and the motor would be "shorted out" and damage might result until the particular trouble should have been located and repaired. With the use of a non-conductive gauge glass, this sort of trouble cannot occur, and, hence, by combining the liquid contact members 31 and 32 with the gauge glass and within that glass, the device is simplified and its operation is made additionally safe because the possibility of shorting is eliminated.

I claim:

1. In a carbonator having a container and means for moving liquid to said container and for discharging it therefrom, electric control means for said liquid moving means and automatic water level, responsive means for actuating said control means, said automatic means including a combined gauge glass and contact housing, said gauge glass comprising a transparent wall member formed of insulating material, there being a plurality of electrical contacts mounted at opposite ends and within said gauge glass and in electrical connection with said control means, one of said last mentioned contacts extending farther toward the bottom of said gauge glass than the other, and a third contact positioned at the bottom of and within sight through said gauge and closer to one of said first mentioned contacts than to the other.

2. In a carbonator having a container formed of electro-conductive material, the combination of means for moving liquid to said container and for discharging it therefrom, electric control means for said liquid moving means and automatic water level, responsive means for actuating said control means, said automatic means including a combined gauge glass and contact housing, said gauge glass comprising a transparent wall member formed of insulating material, there being a plurality of electrical contacts mounted within said gauge glass and in electrical connection with said control means, one of said last mentioned contacts extending farther toward the bottom of said gauge glass than the other, and a fixed third contact positioned within said gauge at the bottom thereof and closer to one of said first mentioned contacts than to the other.

3. In a carbonator having a tank, means for supplying the tank with water and carbon dioxide under pressure to form carbonic acid, including a motor driven pump, the combination of a gauge glass, a hollow housing means secured to the tank at spaced points to support the glass at opposite ends thereof in open communication with the tank above and below a predetermined level and permitting the level of carbonic acid in the gauge glass to assume the level of the carbonic acid in the tank, an insulating member supported in one of the housing means, electrode elements extending from the insulating member and terminating at different levels in the gauge glass, a third electrode supported upon the other hollow housing and terminating a spaced distance from the lower of said electrode elements, said carbonic acid comprising an electro-conductive element bridging the electrodes in relation to the level of the acid in the tank, a control means for the motor operated by said electrodes, and an acid bridge to maintain the level of acid in the tank between predetermined limits.

4. A control for a carbonator having a storage tank and means therein for carbonating the water, said control comprising a transparent gauge glass formed of insulating material, hollow housing means secured one to each end of said gauge glass, said housing means formed of electrically conductive material, means for connecting the gauge glass to the interior of the storage tank including fluid passageways through said housing means, electrical contact elements mounted upon said housing means within and visible through said gauge glass, one of said contact elements extending farther toward the bottom of the gauge glass than the other and a normally submerged third contact element mounted on the bottom one of said housing means and positioned to extend up within said gauge glass and adjacent but separated from one of said first mentioned pair of contacts, said last mentioned contact being in electrical conductive relation with respect to the said one housing member upon which it is mounted.

5. In a liquid carbonator having a liquid container formed of electro-conductive material to store carbonated water and means for moving liquid into said container for carbonation, the combination of an automatic level responsive control for said liquid moving means comprising a transparent gauge glass formed of non-conductive material and being in communication with the interior container at vertically spaced points, a plurality of electric contact members rigidly mounted within said gauge glass, one of said contact members extending farther toward the bottom of said glass than the other, a contact element disposed in close proximity to the lower one of said electric contact members, and an electric conductive means leading from said contacts.

6. In a carbonator having a container and means for moving water and carbon dioxide into said container, an automatic level responsive control for said water moving means comprising a gauge glass formed of non-conductive material and being in communication with the interior of said container, a plurality of electric contact members fixedly mounted upon an insulating member secured at one end of said gauge glass with the contact members extending downwardly into said gauge glass, one of said contact members extending farther toward the bottom of said glass than the other, an electric conductive means leading from said contact and a third contact grounded on said housing and positioned in sight within said gauge glass and closer to one of said first mentioned contacts than to the other to cooperate with said closer contact through a bridge of carbonated water.

7. In a carbonator having a liquid container and means for moving liquid into said container, an automatic control for governing said means in relationship to the level of liquid in the container comprising a transparent gauge glass formed of non-conductive material and being in communication with the interior of said container at vertically spaced points above and below the predetermined level of liquid in the container, a plurality of electric contact members mounted within said gauge glass, one of said contact members extending farther toward the bottom of said glass than the other, an electric conductive means leading from said contacts, and a third contact grounded on said housing and extending upwardly to within said gauge glass to a point closer to one of said first mentioned contacts than the other to cooperate therewith through a bridge of carbonated water.

8. In a carbonator having a container for storing carbonated water, the combination of means for removing water into said container and carbonating it, electrical control means for said water moving means, and an automatic water level responsive means for actuating said control means, said automatic means including a combined gauge glass and contact housing, said gauge glass comprising a transparent wall member formed of insulating material, a plurality of electrical contacts mounted at opposite ends and extending to a point in sight within said gauge glass and in electrical connection with said control means, one of said last mentioned contacts having a lower point of contact with the liquid in the gauge glass than the other, and another contact disposed at the bottom of the gauge glass within sight through the gauge glass for cooperating with said lower contact through a bridge of liquid in said gauge glass and means for injecting carbonic gas into said container.

CHARLES E. ARNDT.